(12) United States Patent
Reading

(10) Patent No.: US 7,757,583 B1
(45) Date of Patent: Jul. 20, 2010

(54) POWER FLOOR BOARDS

(76) Inventor: Randall C. Reading, 11 Myra St., Redlands, CA (US) 92373

( * ) Notice: Subject to any disclaimer, the term of this patent is extended or adjusted under 35 U.S.C. 154(b) by 929 days.

(21) Appl. No.: 11/592,555

(22) Filed: Nov. 3, 2006

Related U.S. Application Data

(60) Provisional application No. 60/733,532, filed on Nov. 3, 2005.

(51) Int. Cl.
*G05G 1/60* (2008.04)

(52) U.S. Cl. ........................................ 74/564

(58) Field of Classification Search ............. 74/560, 74/561, 564; 180/219; 280/163, 164.1, 288.4, 280/291
See application file for complete search history.

(56) References Cited

U.S. PATENT DOCUMENTS

| | | | | |
|---|---|---|---|---|
| 1,261,442 A * | 4/1918 | Rigby | ........................ | 280/291 |
| 1,630,760 A * | 5/1927 | Powell | ........................ | 477/215 |
| 3,631,739 A * | 1/1972 | McArthur | .................... | 74/513 |
| 4,451,057 A * | 5/1984 | Lawson | ....................... | 280/291 |
| 4,807,860 A | 2/1989 | Simons | | |
| 5,090,715 A * | 2/1992 | Nakajima et al. | ........... | 280/166 |
| 6,042,148 A * | 3/2000 | Howell | ....................... | 280/827 |
| 6,116,630 A * | 9/2000 | Thomas | ....................... | 280/291 |
| 6,270,106 B1 * | 8/2001 | Maki et al. | ................... | 280/291 |
| 6,655,705 B2 * | 12/2003 | Turgeon | ...................... | 280/163 |
| 6,719,316 B1 * | 4/2004 | Anthony | ..................... | 280/291 |
| 6,893,038 B2 * | 5/2005 | Egan | .......................... | 280/291 |
| 7,431,118 B1 * | 10/2008 | Hogg | .......................... | 180/219 |
| 7,513,520 B2 * | 4/2009 | Okuyama | ................... | 280/166 |

* cited by examiner

*Primary Examiner*—Vicky A Johnson
(74) *Attorney, Agent, or Firm*—Law Offices of David L. Hoffman

(57) ABSTRACT

In one embodiment, there are power floor boards for a motorcycle or other two or three wheeled open vehicle, that is capable of using foot rests, such as an ATV. Each power floorboard has a toe part and a heel part. The two parts move from a first position where they are essentially flat on top and fully retracted, to a second position where the toe pad is angled up with respect to the heel pad, and both the heel and toe pads are fully extended toward a front of the vehicle. The toe pad is on rails and moves forward by a worm gear. The rails are fixed to the vehicles footrest mounts. In a particularly preferred embodiment of the invention, the angular motion of the toe pad compared to the relatively linear or flat motion of the heel pad, is achieved by a pivotable connection of the toe pad to the heel pad, and an elongated, relatively S-shaped cam slot with a follower therein for driving the toe pad first to slowly incline, then to faster incline, and then to slowly incline.

20 Claims, 9 Drawing Sheets

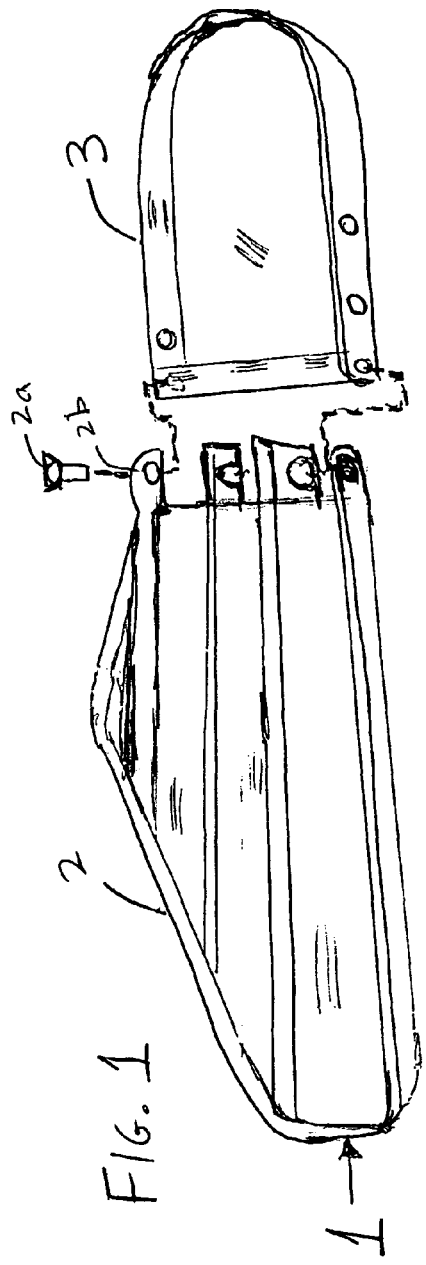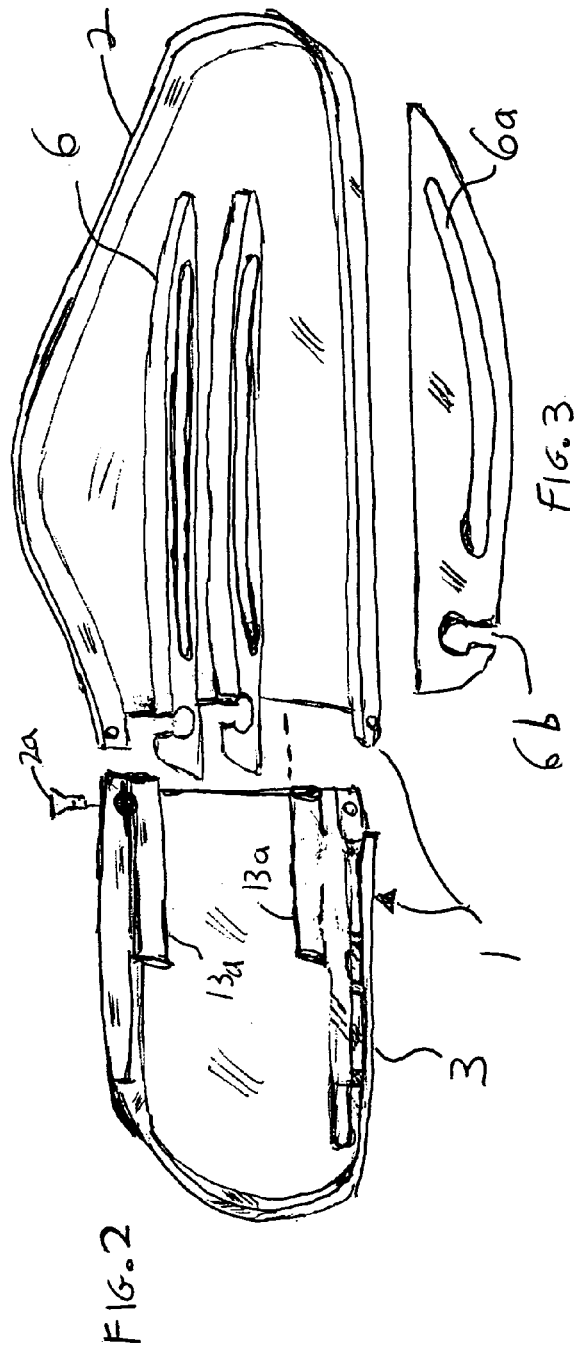

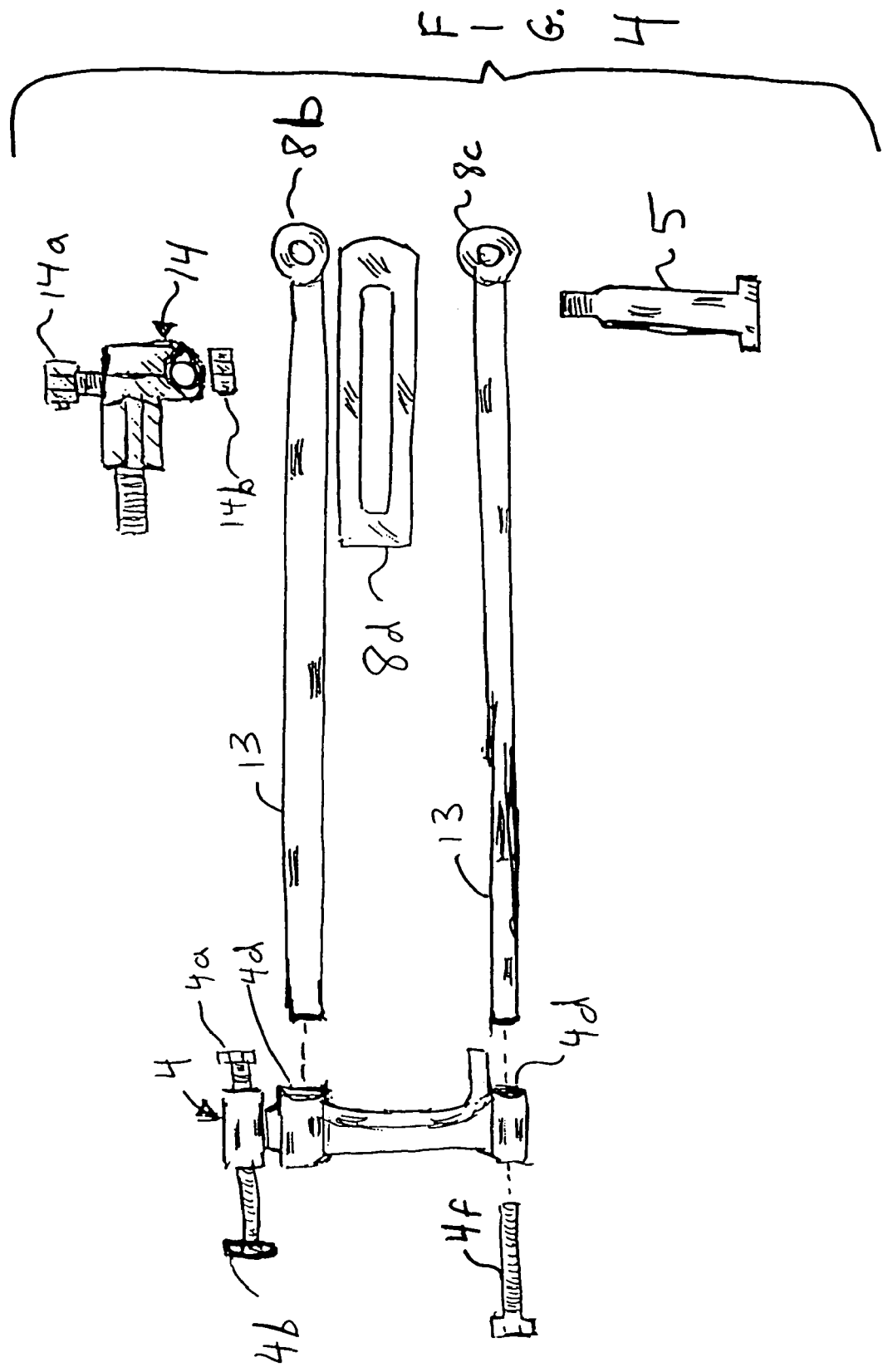

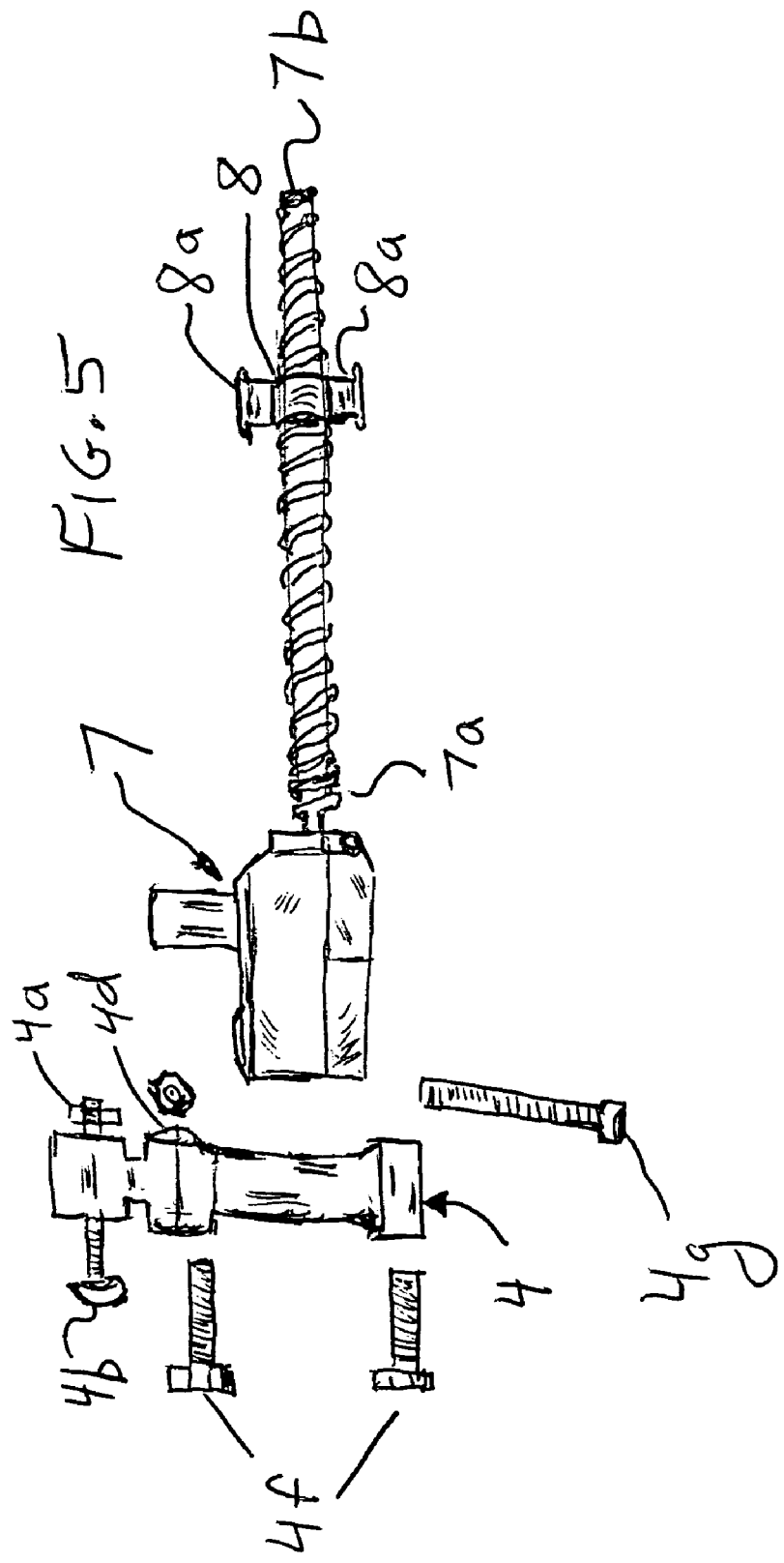

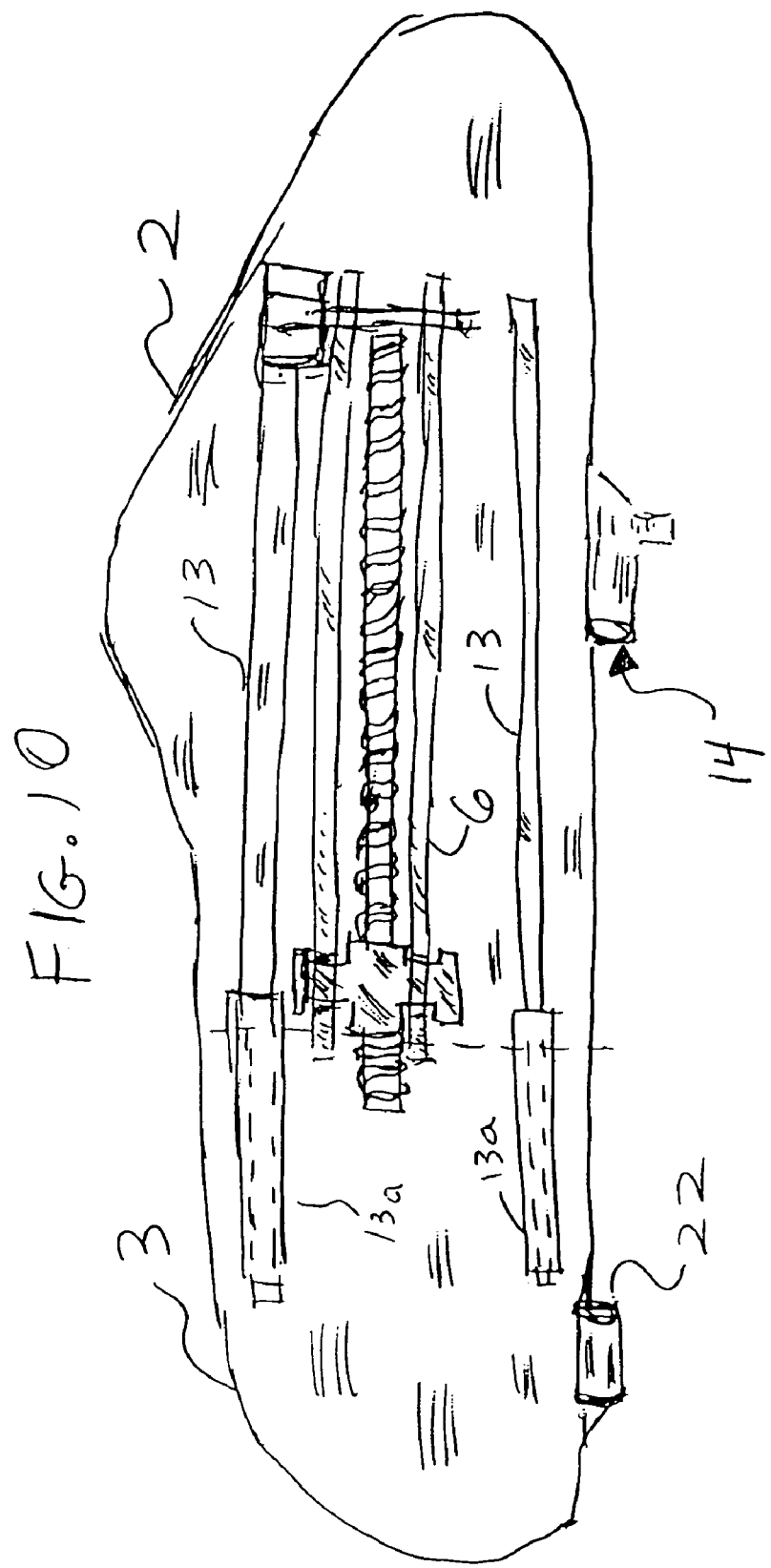

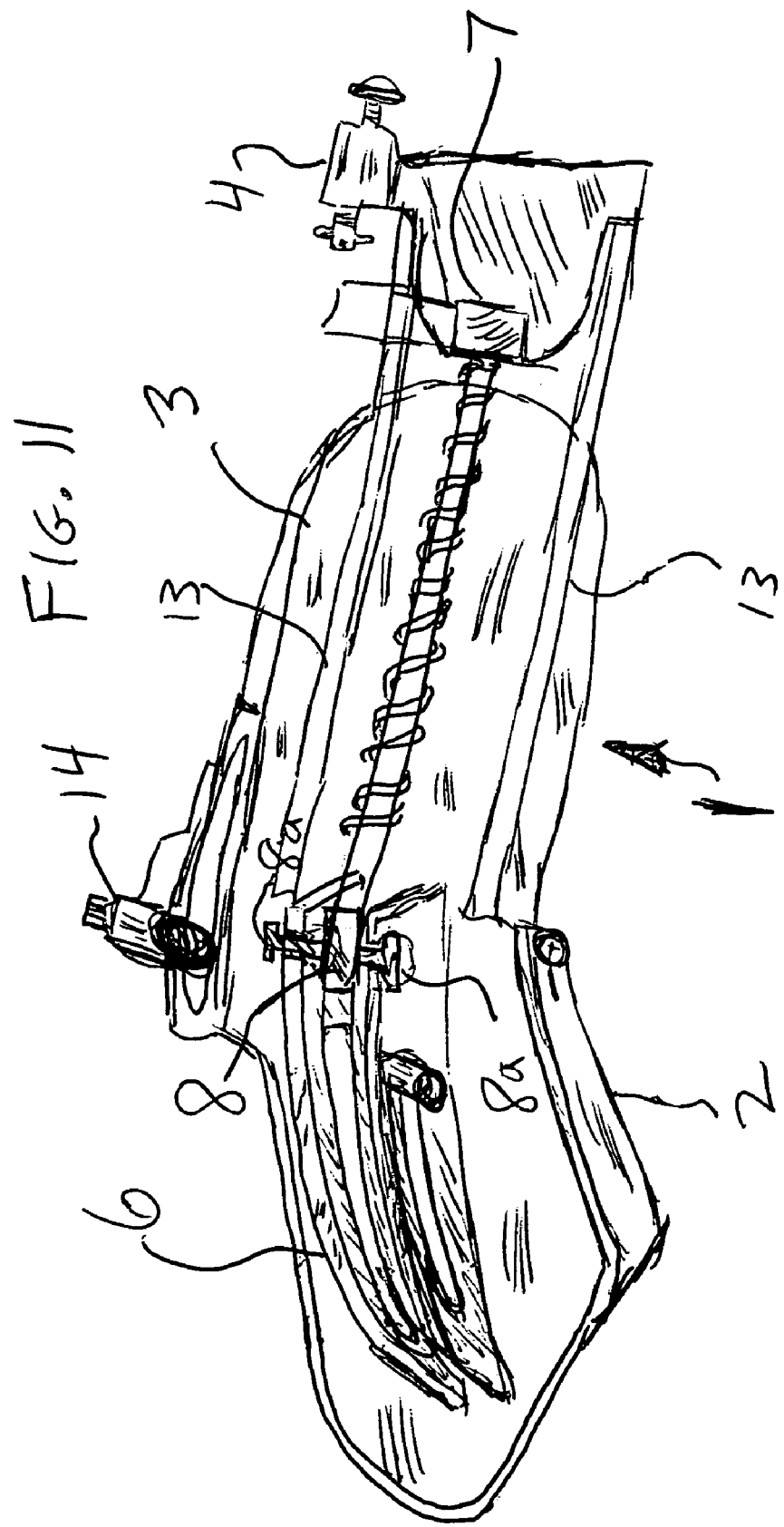

POWER FLOOR BOARDS

CROSS REFERENCE TO RELATED APPLICATION(S)

This application claims priority from U.S. Provisional Patent Application Ser. No. 60/733,532 filed Nov. 3, 2005, and which is incorporated by reference herein.

BACKGROUND OF THE INVENTION

1. Field of the Invention

This application relates to movable floor or foot boards for a vehicle such as a motorcycle.

2. Description of the Related Art

On motorcycles, mopeds, all terrain vehicles (ATVs) and other motorized vehicles, there is normally a place to rest the rider's feet. Typically, these are pegs on a motorcycle. A more elaborate foot rest can have a heel-rest. For example, in U.S. Pat. No. 6,893,038 to Egan, there is a peg and a foldable heel-rest. In U.S. Pat. No. 6,719,316 to Anthony, there is a footrest which is simply a floorboard. The footrest has a concave cutout in its outer edges for a foldable foot peg. U.S. Pat. No. 6,042,148 to Howell discloses a footrest that can telescope laterally outward. U.S. Pat. No. 6,270,106 to Maki et al teaches an ATV footrest platform which has a heel portion that is higher than a foot portion so the rider can readily shift gears positioned near the toes.

SUMMARY OF THE INVENTION

In one embodiment, there are power floor boards for a motorcycle or other two or three wheeled open vehicle, that is capable of using foot rests, such as an ATV. Each power floorboard has a toe part and a heel part. The two parts move from a first position where they are essentially flat on top and fully retracted, to a second position where the toe pad is angled up with respect to the heel pad, and both the heel and toe pads are fully extended toward a front of the vehicle. The toe pad is on rails and moves forward by a worm gear. The rails are fixed to the vehicles footrest mounts. In a particularly preferred embodiment of the invention, the angular motion of the toe pad compared to the relatively linear flat motion of the heel pad, is achieved by a pivotable connection of the toe pad to the heel pad, and an elongated, relatively S-shaped cam slot with a follower therein for driving the toe pad first to slowly incline, then to faster incline, and then to slowly incline.

BRIEF DESCRIPTION OF THE DRAWINGS

FIG. 1 is a partially exploded view of the top of one power adjustable foot board (left side board) in accordance with one embodiment of the invention, without several elements of the floor board;

FIG. 2 is a view similar to FIG. 1 but of the underside of the floor board with slotted members attached thereto;

FIG. 3 is a side view of one slotted member of the floor board of FIG. 1;

FIG. 4 is a view of several parts for the floor board of FIG. 1;

FIG. 5 is a perspective view of a reduction gear worm drive and associated parts for the power floor board of FIG. 1;

FIG. 10 is a perspective view of the underside of a fully retracted floor board of FIG. 1; and FIG. 11 is a perspective view of the underside of a fully extended floor board of FIG. 1.

DESCRIPTION OF THE PREFERRED EMBODIMENT(S)

Figure 6:
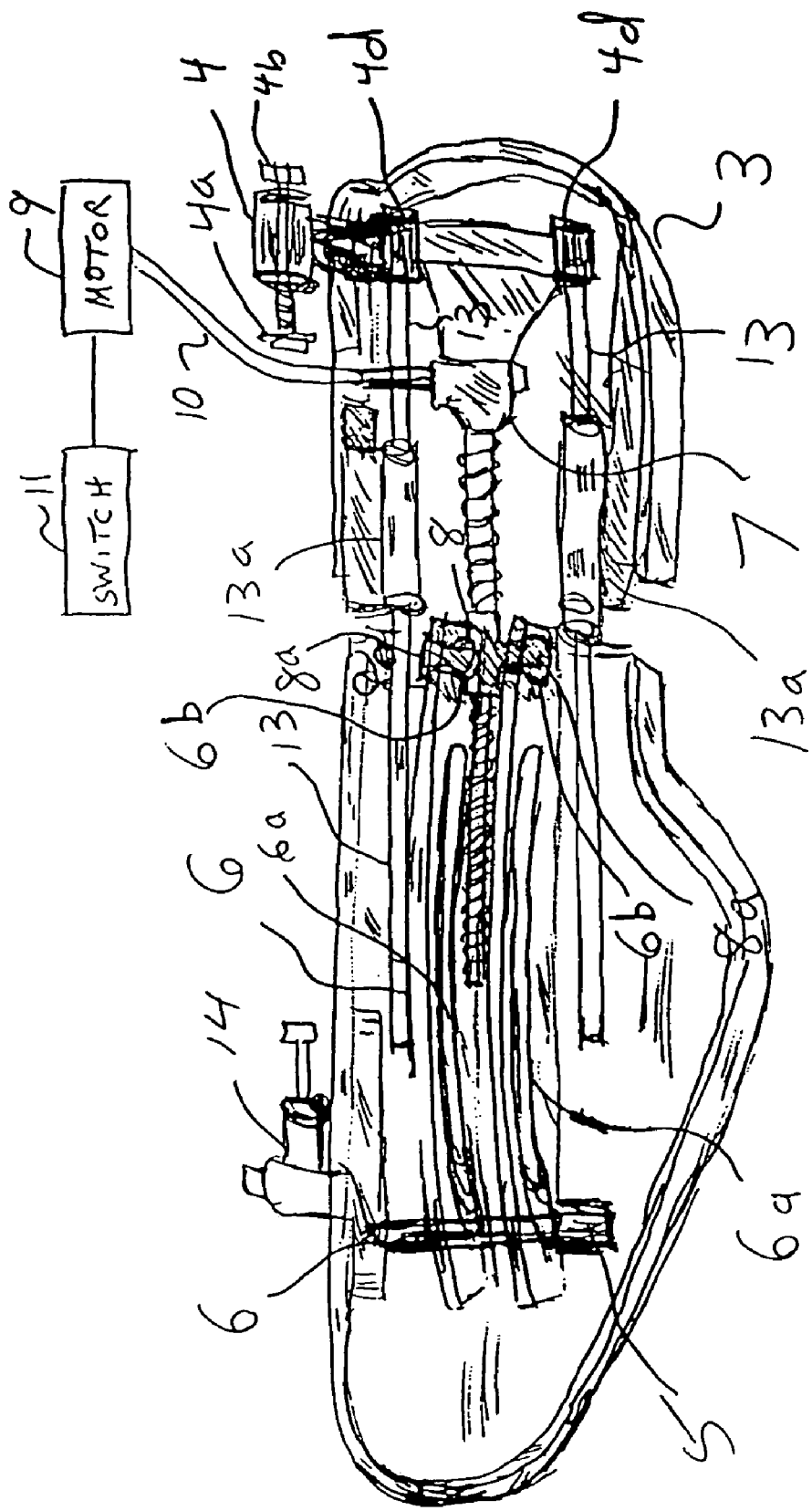
FIG. 6 is a perspective view of the underside of the power floor board of FIG. 1, with electric motor and other parts fully assembled.

In on embodiment, a motorized footrest or floorboard is disclosed that moves forward from a stock position sufficiently to create the ability to stretch out one's legs similar to highway pegs as well as allowing the front two thirds or so of the board to angle upward, preferably up to about thirty degrees, to provide for a comfortable foot to ankle angle. The mechanism allows for both the shifter and brake levers to move along with the moving boards keeping the shifter and brake levers in the same relationship to the rider's feet. A particularly preferred environment for the movable footboards is for a motorcycle, and most particularly for touring motorcycles such as the Harley Davidson® touring bike. The footboard is easily made to fit other production motorcycles.

As shown in FIG. 1, the board 1 is comprised of a toe pad 2 having a heel side and toe side, that is roughly two thirds of the overall length and a heel pad 3 having a heel side and toe side that makes up the remaining roughly one third length of the floor board. Heel side of toe pad 2 is hinged to toe side of heel pad 3, by a bolt or pin 2a through holes 2b. Heel pad 3, whether cast, Billet milled or fabricated, has two cylinders 13a that allow the heel pad to slide in a lengthwise direction on two parallel rods 13 (see FIG. 6). The rods 13 have a heel end a toe primary end as well as an inside and an outside.

Figure 9:
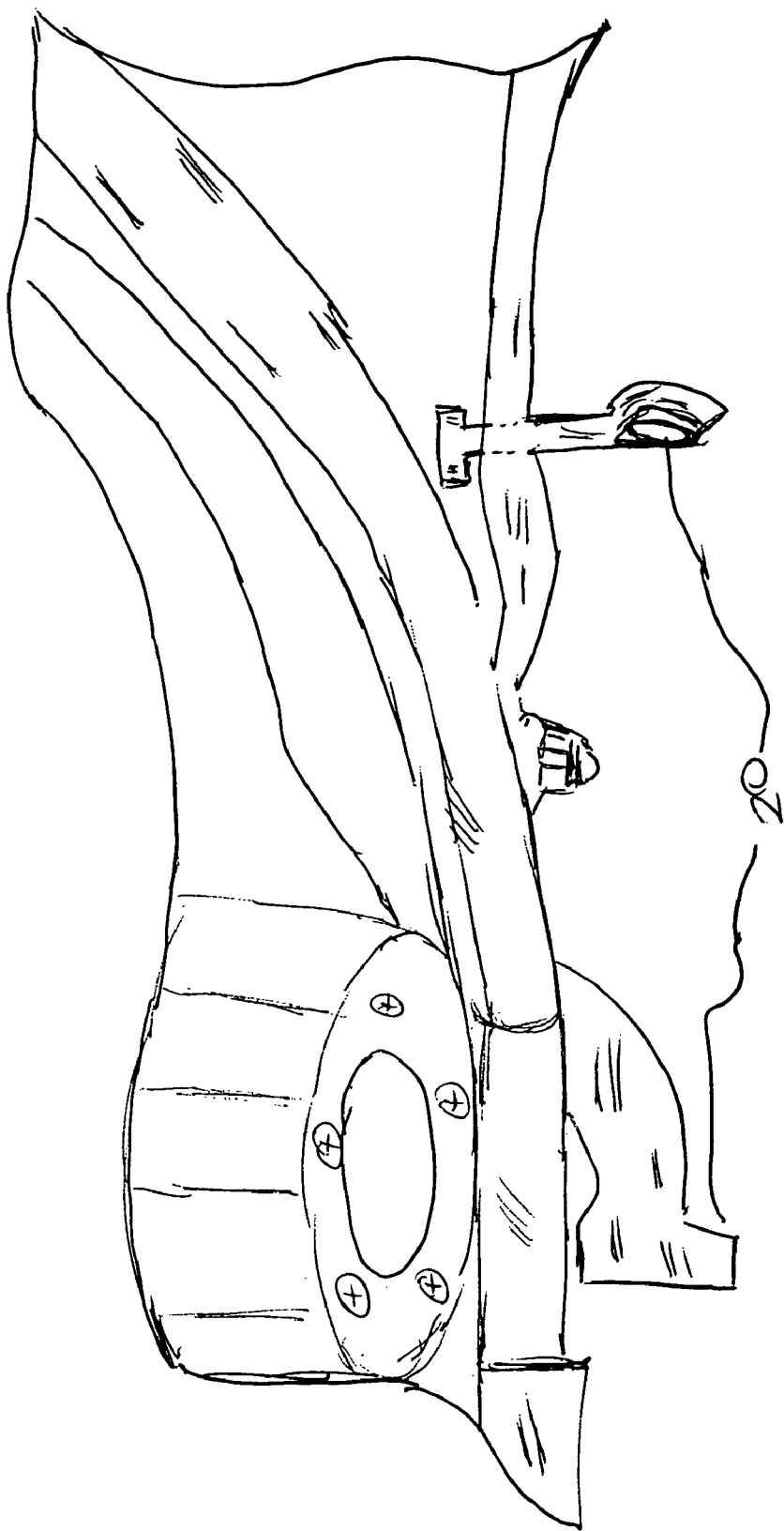
FIG. 9 is a perspective view of a motorcycle and its floor-board mounts for mounting the floor board of FIG. 1.

The rods 13 fit slidably through cylinders 13a mounted (e.g., one piece cast or made by CNC, as part of the heel pad, welded or otherwise fixed) to the underside of the heel pad (see FIG. 6 which is slightly longitudinally exploded and FIG. 10). At the heel side of the rods 13, they are fixed to mounting bracket 4. Bracket 4 ties the two rods 13 together. Bracket 4 is fixed to the vehicle by bolt 4a and nut 4b (FIG. 6) attaching to a vehicle by a standard (or added) rear mount 20 (FIG. 9) through bore 22 of bracket 4. The rod 13 are bolted at their heel ends by bolts 4f or otherwise fixed to bracket 4. Bracket 4 is mounted to the stock OEM motorcycle floorboard bracket 20 (or mounts) (see FIG. 9), and is adjustable by a predetermined amount as it applies e.g., to a Harley Davidson® motorcycle (e.g., one and one quarter inch (1¼") fore and aft) by mounting bracket 4 to the front or rear of the stock motorcycle bracket and then can be augmented another predetermined amount (such as one inch (1")) forward by using a spacer block. As shown in FIG. 5, bracket 4 has tubes 4d for the ends of the rods 13, and bolts 4f may be used to hold the rods. A bolt 4g fixes the worm gear 7 assembly to the bracket 4.

Rods 13 at the toe end are tied together by a shouldered connecting bolt 5 (FIGS. 4 and 6). The connecting bolt 5 passes through slots in two parallel mounted cam blades 6, which are fixed to the underside of toe pad 2 (e.g., by bolting, or made as one piece cast into or CNC in a billet). The bolt 5 passes through a tube 8c and threads into a short threaded tube 8b fixed to the toe end of inside rod 13. The bolt may then travel the length of slot 6a in cam blades 6 when a reduction geared worm-drive 7 (worm-gear) drives the heel pad 3 and toe pad 2 assembly fore and aft. Worm-gear 7 has a drive end 7a and a far end 7b. The worm gear 7 attaches to mounting bracket 4 at the drive end 7a. The far end 7b attaches via a pivoting nut 8 to the heel end of the cam blade 6 assembly. Nut 8 has two wings 8a which fit in key shaped holes 6b in the cam blades 6 (FIGS. 5 and 10-11). The inner parallel rod 13 (closest to the motorcycle frame) has a slotted mounting bracket 8d at its foremost primary end to allow for further fixed fore and aft adjustment, in conjunction with mounting bracket 4 above. The slot in bracket 8d also provides a channel for bolt 14a and attaching nut 14b from adapting bracket 14, to ride in and hold the nut from turning so there is no need for a backside wrench when loosening or tightening the adapting brackets nut and bolt during adjustment. The slotted mounting bracket 8d together with adapting bracket 14 (which alternatively could include the slot, instead of the mounting bracket) attaches to stock OEM motorcycle floorboard brackets 20 using stock HD OEM shouldered allen bolts. An alternative is to put a slot in mounting bracket 14, and no slot in bracket 8d.

The slotted brake arm 12 has an elongated S-shaped or double-curved slot 12a. While other shapes potentially could work, in this preferred embodiment, this elongated S-shape is important. The shape allows the front toe pad 2 to move over existing roller bearing 15 without any substantial effect on the position of existing brake arm 13 on the vehicle. Note that as the toe pad 2 moves toward the fully extended position, brake leverage from the user's foot on the pad increases.

The S-shape is such that for a first portion of movement from the retracted position, the inclination of the toe-pad rises very slowly, close to flat. For a second portion of movement from the refracted toward the extended position, the toe pad's inclination increases more rapidly. For a third portion of movement, the toe pad's inclination slowly tapers off and very little further inclination is achieved.

Figure 7:
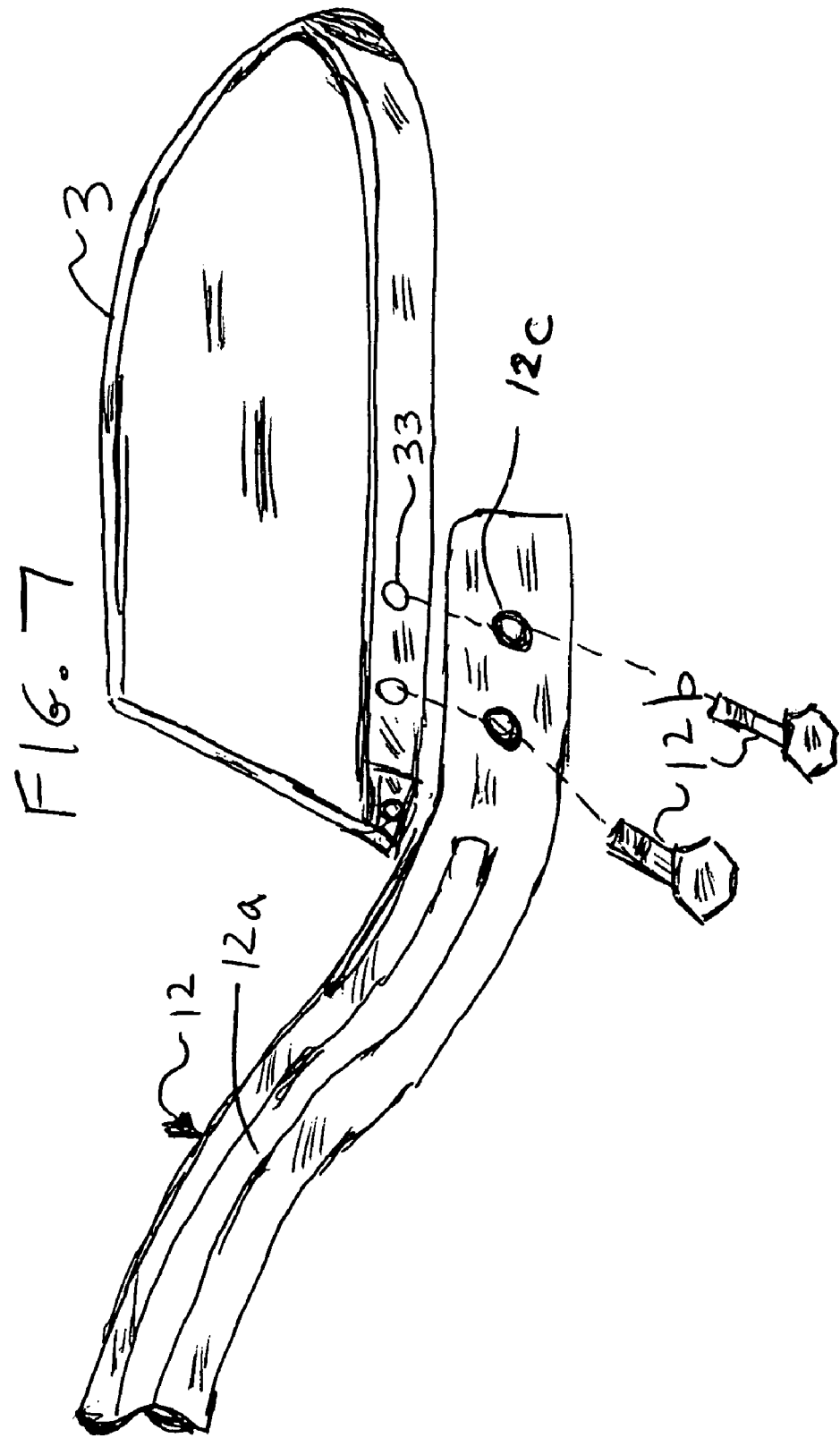
FIG. 7 is an exploded underside perspective view of a heel pad, slotted arm and bolt for attaching the arm to the heel pad.

The arm 12 is connected to the heel pad 3 by bolts 12b through holes 12c and 33 (FIG. 7).

Therefore, the shape of the slot and the pivot point of the toe pad are critical to keep the same height of the brake pad.

A single twelve volt electric motor 9 resides between the right and left floorboards and is mounted using a collar sleeve bracket around the motor, and then attaches using a single Nylon nut threaded to the front motor-mount dampener bolt. Motor 9 then drives worm gears 7 of both footrests via flexible cable shafts 10 from each side of the motor. The motor is controlled by an on-off-on switch 11, preferably mounted on the handlebar and preferably the left side under the hand-grip. Preferably, the switch can be actuated without moving one's hand from the driving position.

Figure 8:
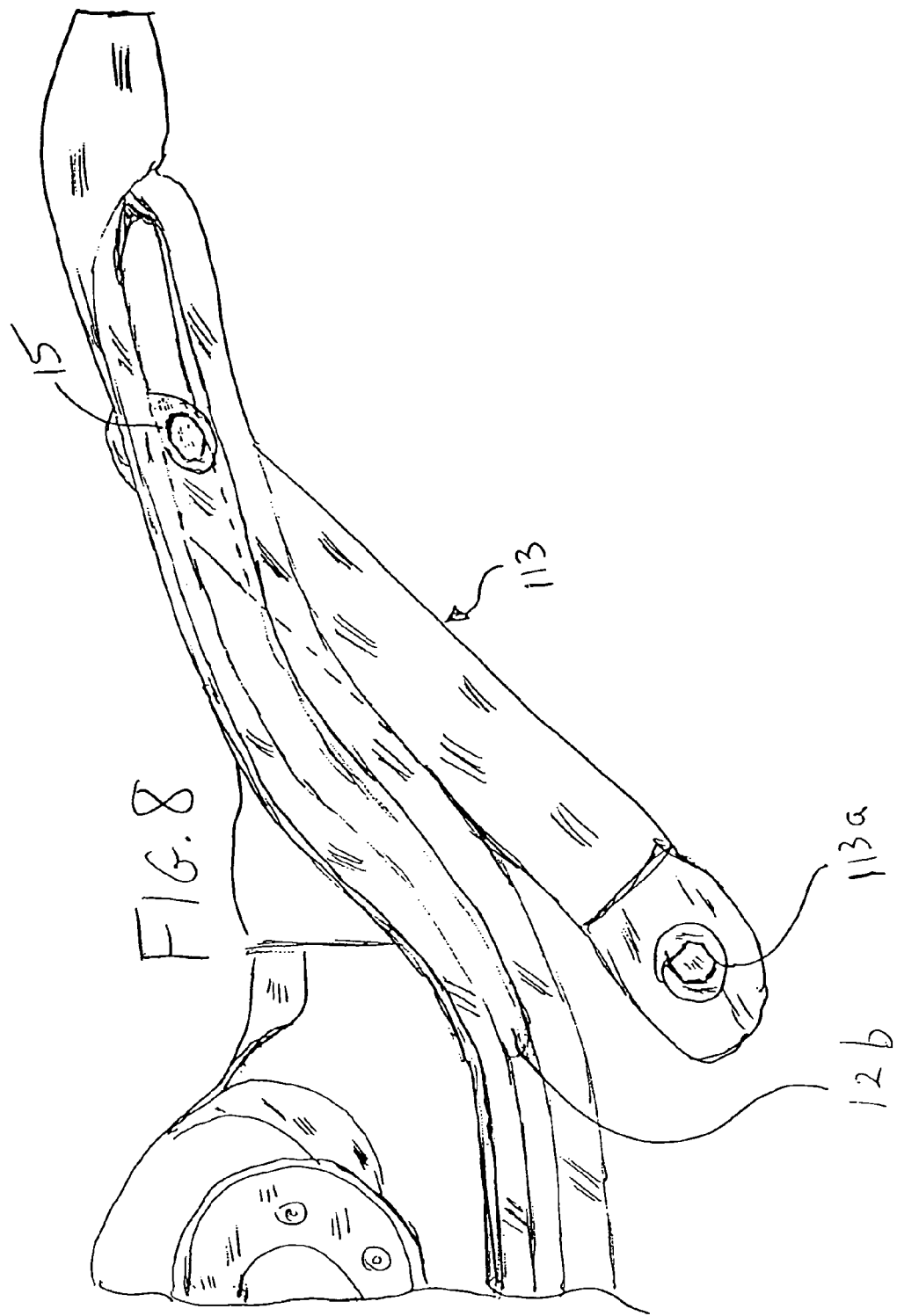
FIG. 8 is a perspective view of the slotted arm of FIG. 7 mounted on a motorcycle brake arm.

As shown in FIG. 8, brake pedal arm 12 is an S shaped slotted arm with a foot peg or pedal at one end that is mounted on the other end by a shoulder bolt through a hole in arm 2 onto the heel pad 1 on the inside edge and is free to pivot. The slot on the arm will ride over a roller bearing mounted on a modified stock foot brake arm 113 or a manufactured arm. Either way it will be a simple flat strap of steel roughly eight inches (8") long and where a pedal normally would be, a bearing will reside such that the slotted brake arm 12 travels along the bearing when the power floorboard is moving fore and aft and keeps the pedal end in normal relationship to the floorboards and the rider's foot. The gear shifter on the opposite side of the motorcycle will function the same way. Where the foot-shifter pedal or peg normally resides it is replaced with a bearing riding on an identical arm 12 or mirror image with the exception of a peg at the one end will be preferred to a pedal. At the free end of brake arm 113 is an existing bearing or bolt 113a to hold the brake arm 113 as is standard on a motorcycle.

FIG. 7 shows arm 12 and pad 1 with additional holes and threads in pad 1 to allow for arm 12 to mount fore and aft as well, to stay in relationship when the boards (in their selected mounting position) are adjusted fore and aft. Be careful to keep or adjust the brake pedal in its usual position.

When the worm gear drives pivoting nut 8 away the nut drives the cam blades 6 forward in relationship to the rods 3 and the connecting bolt 5. In other words, bolt 5 is driven from the pointed end of blades 6 to the thicker end. While the worm gear drives the whole floorboard arrangement forward, it also causes toe pad 2 to move away from the axis line of rods 13 because the height or the distance of the slots in blades 6 and more importantly the connecting bolt 5 are further away from toe pad 2 when driven to the thicker end of blade 6. By moving toe pad 2 away from the axis line while holding the heel side of toe pad 2 at the hinge points (see FIG. 1), the toe side of toe pad 2 is forced to angle upward by rotating around the axis of bolt 5 (see FIG. 11).

The to pad 2 with cam blades 6 shown independently also have the option of being manufactured from billet aluminum in a CNC process or cast that will make them one piece and instead will create one thick slot approximately one and one half inches (1½") wide as opposed to two thin rails.

The slatted mounting bracket on the rod 13 will be constructed such that it makes contact with the stock front motorcycle mounting bracket all along its adjustable length. It acts as a stop, in order to prevent the whole board assembly from rotating around the longitudinal axis of the front and rear mounting points. The weight or pressure of the rider's foot will tend to push the outside edge of the board downward if this feature is absent.

In summary, the rider rests his or her heel on the heel pad and ball of the foot on the primary pad. In the initial position, the pads may be flat and together (FIG. 10—upside down view of retracted position). The rider, for comfort, for change of position, or whatever reason, may want to extend the footrest. The rider actuates the motor (moves the control switch to "forward") and lets it run until satisfied with the position of the heel and toe pads 3, 2, respectively. While the motor is running, the worm gear drives the nut forward with respect to the vehicle, thereby driving the footrest forward. Heel pad 3 stays horizontal because toe pad 2 pivots upward with respect to pad 1 due to the hinge. The connecting bolt moves relative to the cam blades' slots, as the cam blades 6 are driven forward by the worm drive. The curve of the cam blades' slots causes toe pad 2 to rotate upward more and more as the pads 2 and 3 move forward. At the most extended position, the angle of toe pad 2 to heel pad 3 is preferably about thirty degrees although other angles may be used. The rods 13 slide in the tubes 13a during this motion and the mounting brackets 4 and 14 stay fixed. When the desired position is reached, the rider lets switch 11 go and it returns to "off." To return toward or to the fully retracted position, the rider moves and holds the switch in "reverse," and then lets go when in the desired position, the same as a power window switch. As the board moves forward, the board splits at the toe and heel pads. As soon as that happens, the split provides a rest for the heel of the rider. The split prevents sliding down of the foot contrasted with an angled board, and leaves a horizontal platform for the heel to rest on. One also gains additional distance for one's feet, the forward movement elongating the board, and providing more room for the heel and foot. The split also helps block wind on the foot.

The function of the angled outer portion of the toe pad is also to provide a bowl-legged or duck footed foot position, which is usually more comfortable then straight forward.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A floor board assembly for an open air vehicle having at least two wheels, a front and a rear, the floor board assembly comprising:
   a heel pad and a toe pad hinged together;
   a guide for the heel pad and toe pad to move together, selectively toward the front and rear;
   means for mounting the guide to a vehicle;
   means for driving the heel pad and toe pad together toward the front and rear, selectively; and
   means for causing the toe pad to pivot so as to incline upward as the heel pad and toe pad are driven forward, and for causing the toe pad to pivot so as to decline toward a substantially flat position with respect to the heel pad or the heel pad and toe pad are driven rearward.

2. The floor board assembly of claim 1, wherein the means for causing the toe pad to pivot comprises a cam and guide rod.

3. The floor board assembly of claim 2, wherein the cam comprises a slotted bracket.

4. The floor board assembly of claim 3, wherein the slotted bracket has curved slot.

5. The floor board assembly of claim 3, wherein the slotted bracket has a slot having a curve.

6. The floor board assembly of claim 1, wherein the floor board assembly further comprises a brake arm member mounted at one end to a footrest and the brake arm member having a portion for movably mounting to an existing brake arm.

7. The floor board assembly of claim 6, wherein the one end of the brake arm member is attached to the heel pad, and there is a slot formed in the portion of the brake arm member for movably mounting to an existing broke arm, the slot for slidably receiving an end portion of the brake arm member.

8. The floor board assembly of claim 7, wherein the brake arm slot has a double curve.

9. The floor board assembly of claim 1, wherein the heel pad is about one half a length of the toe pad.

10. The floor board assembly of claim 1, wherein the means for driving comprises a screw drive and a motor.

11. A floor board assembly for an open air vehicle having at least two wheels, a front and a rear, the floor board assembly comprising:
   a footrest having a heel pad and a toe pad hinged together;
   a guide for the heel pad and toe pad to move together, selectively toward the front and rear;
   mounting brackets for mounting the guide to a vehicle;
   a driver with a motor and control for driving the heel pad and toe pad together toward the front and rear, selectively; and
   a cam blade and follower rod for causing the toe pad to pivot so as to incline upward as the heel pad and toe pad are driven forward, and for causing the toe pad to pivot so as to decline toward a substantially flat position with respect to the heel pad when the heel pad and toe pad are driven rearward.

12. The floor board assembly of claim 11, wherein the driver comprises a screw drive which pushes the toe pad back and forth along guide rods.

13. The floor board assembly of claim 12, wherein the toe pad pivots up or down in response to the driver pushing the toe pad back and forth.

14. The floor board assembly of claim 11, wherein the cam blade comprises a slotted bracket.

15. The floor board assembly of claim 14, wherein the slotted bracket has a slot having a curve.

16. The floor board assembly of claim 11, wherein the floor board assembly further comprises a brake arm member mounted at one end to the footrest and the brake arm member having a portion for movably mounting to an existing brake arm.

17. The floor board assembly of claim 16, wherein the one end of the brake arm member is attached to the heel pad, and there is a slot formed in the portion of the brake arm member for movably mounting to an existing brake arm, the slot for slidably receiving an end portion of the brake arm member.

18. The floor board assembly of claim 17, wherein the brake arm slot has a double curve.

19. The floor board assembly of claim 11, wherein the heel pad is about one half a length of the toe pad.

20. A method for adjusting a position of a floor board for a two-wheeled vehicle, the floor board being mounted to the vehicle and having a footrest with a heel pad and a toe pad pivotably connected together, the method comprising;
   selectively driving the footrest forwards and backwards, and
   rotating the toe pad upward in relation to the heel pad when driving the footrest forward and rotating the toe pad downward in relation to the heel pad when driving the footrest backward.

* * * * *